United States Patent [19]

Grehier

[11] 4,064,321

[45] Dec. 20, 1977

[54] FUEL CELL WITH ELECTRODES SEPARATED BY INTERMEDIATE ELEMENTS

[75] Inventor: Alain Grehier, Paris, France

[73] Assignee: Institut Francais du Petrole, France

[21] Appl. No.: 657,531

[22] Filed: Feb. 12, 1976

[30] Foreign Application Priority Data

Feb. 25, 1975 France .............................. 75.05824

[51] Int. Cl.² .............................................. H01M 8/02
[52] U.S. Cl. ...................................................... 429/34
[58] Field of Search .................. 136/86 R, 14; 429/34

[56] References Cited

U.S. PATENT DOCUMENTS

| 2,687,446 | 8/1954 | Merrill | 136/145 |
| 2,880,260 | 3/1959 | Strauss | 136/143 |
| 2,909,588 | 10/1959 | Rolph | 136/145 |
| 3,037,899 | 6/1962 | Vedovelli | 136/145 |
| 3,650,839 | 3/1972 | Lang | 136/86 R |

*Primary Examiner*—John H. Mack
*Assistant Examiner*—H. A. Feeley
*Attorney, Agent, or Firm*—Craig & Antonelli

[57] ABSTRACT

In the compartments of the fuel cell are located intermediate elements leaving two free spaces of minimum volume in the vicinity of the two electrodes respectively, which delimit each compartment. These two free spaces extend substantially over the whole area of the electrodes and the intermediate elements are provided with perforations for ionic conduction between the two free spaces.

13 Claims, 3 Drawing Figures

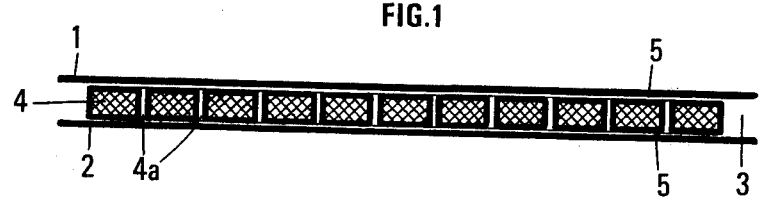
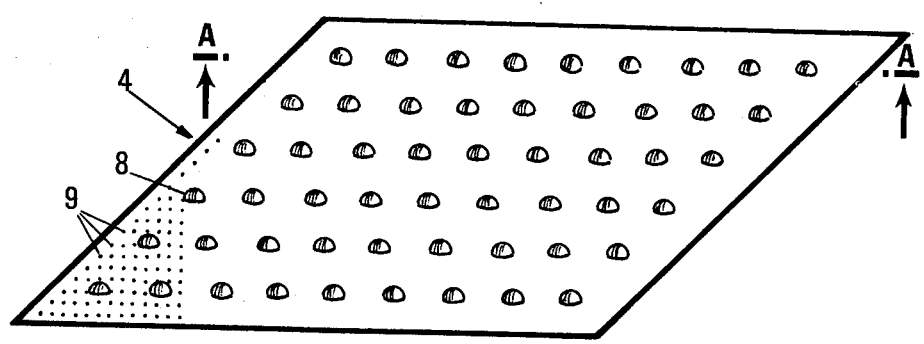
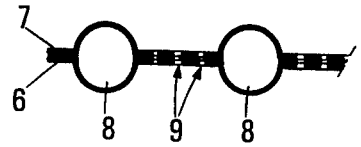
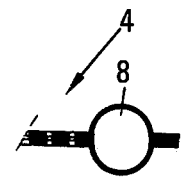

FUEL CELL WITH ELECTRODES SEPARATED BY INTERMEDIATE ELEMENTS

The present invention relates to a fuel cell having at least one intermediate element separating its electrodes.

Fuel cells comprise a stack of electrodes which delimit compartments between each other. Some of these compartments are designed to contain an electrolyte, while others are fed with fuel, and still others are fed with a combustion-sustaining fluid, or oxidant.

For technological reasons, such as, for example, the small thickness of the electrodes, or the need to cast a solidifying resin which locally penetrates between the electrodes, to achieve a good sealing of the fuel cell block, and also in order to prevent the formation of short-circuits between the electrodes, it becomes necessary to maintain some spacing between the latter.

Consequently, the volume of the compartments delimited by the electrodes is large, thus requiring large quantities of fuel, oxidant and electrolyte for completely filling these compartments during the operation of the fuel cell.

At least some of the products are costly and, it should be also noted that their weights are not negligible and increase the weight of the fuel cell, which results in a reduction in its power per mass unit, this power being defined by the ratio of the electric power to the weight of the fuel cell.

Now, as it is well known to those skilled in the art, the electric power delivered by a fuel cell does not depend on the volume delimited by the electrodes, but on the surface of these electrodes.

An object of the invention is thus to reduce as much as possible these drawbacks of prior art fuel cells.

This object is achieved, according to the invention, by using a separating element or inter-electrode grid of a special design which, without any reduction in the spacing between the electrodes makes it possible to reduce the quantities of products required for filling the fuel cell block during operation of the fuel cell.

The invention will be properly understood and its advantages made apparent from the following description illustrated by the accompanying drawings wherein:

FIG. 1 is a diagrammatic cross-section of an inter-electrode space in a fuel cell, FIG. 2 illustrates an embodiment of a separating element according to the invention, FIG. 2 A shows a section of this element along line A—A of FIG. 2.

In FIG. 1 are illustrated, in cross-section, two electrodes 1 and 2 forming part of a stack of electrodes which constitutes a fuel cell block. These electrodes delimit between each other a compartment 3 which, during the operation of the fuel cell, is filled with a liquid or gas, such as an electrolyte, a fuel, or an oxidant (comburent).

According to the invention, a partition element 4 between the electrodes 1 and 2 fills the greatest part of the inter-electrode space 3, while leaving for the products contained in this space a free volume which is reduced as much as possible in the vicinity of each electrode, this volume extending substantially over the whole surface of the electrode.

The intermediate element 4 is provided with perforations 4a in a direction substantially perpendicular to the electrodes which connect the spaces 5 to each other.

It is clearly apparent that the use of such an intermediate element considerably reduces the quantity of product required to fill the inter-electrode space, without however reducing the power of the fuel cell, since the active area of the electrode is not reduced.

This advantage is the greater as the cost of the product filling the space between the electrodes 1 and 2 is higher.

Moreover, when the feeding circuit of this inter-electrode space comprises, in a known manner, a storage tank, so as to regulate at least one characteristic of the flow of the product delivered by this feeding circuit, it becomes possible to use a smaller tank, thereby obtaining a substantial reduction of the weight and bulk of the entire fuel cell.

According to an advantageous embodiment of the invention the inter-electrode element will have a specific gravity at most equal to that of the product contained in the inter-electrode space where this element is placed.

The density of the intermediate element will preferably be selected as low as possible and lower than that of the product contained in the inter-electrode space. This, in addition to the above-indicated advantages, substantially reduces the weight of the fuel cell.

Intermediate elements according to the invention may be located in all the compartments delimited by the electrodes of a fuel cell, regardless of the nature of the products contained in these compartments, i.e. whether these products are liquid or gaseous.

It is however possible to place intermediate elements only in certain compartments, depending on the goal which is aimed at.

The material constituting the intermediate element will obviously in any case be so selected that it causes no chemical reaction detrimental to a good operation of the fuel cell, at the contact with the product feeding the compartment where this element is located.

FIGS. 2 and 2 A illustrate a particular, but non-limitative embodiment of the intermediate element 4.

FIG. 2 is a perspective view of the element 4, while FIG. 2 A shows a cross-section along line A—A of FIG. 2.

This intermediate element is formed of two very thin sheets 6 and 7 (FIG. 2 A), made for example of polyvinylchloride, polyethylene, polypropylene, or polyamide 11 . . . etc. . . . , these sheets been preferably internally coated with a sheet of polyvinylidenechloride and delimiting locally between each other tight confined spaces, such as those indicated at 8, having the shape of bubbles. Between the spaces 8, the two sheets 6 and 7 forming the intermediate element are perforated from side to side, so as to form orifices 9 allowing ionic conduction from one electrode to the other.

Spaces such as 8 are filled with a gas which is chemically neutral or non-reactive with respect to the products filling the fuel cell block, such as air or a gas at a sufficient pressure preferably equal to that of the product contained in the inter-electrode space 3 (FIG. 1). The use of an intermediate element is of particular interest when the inter-electrode space is fed with a liquid.

By way of examples, the use of intermediate elements 4, formed of polyamide sheets 11, and located in the compartments of a fuel cell which are fed with liquid electrolyte, made it possible to decrease by about 50% the weight of electrolyte in the fuel cell block, without reducing the power of the fuel cell. To this reduction of the volume of electrolyte contained in the fuel cell block corresponds a decrease by about 15% of the overall weight of the fuel cell, which in this case had a nominal electric power of 5 kw.

Other embodiments of the element 4 may be devised without departing from the scope of the present invention.

For example, the intermediate element may be made of expanded polystyrene provided with perforations from side to side, or be shaped as a parallelepiped with a thickness smaller than the spacing of the electrodes . . . etc . . .

There will generally be used intermediate elements whose volume forms at least 95% of the volume of the inter-electrode space wherein this element is located.

What I claim is:

1. A fuel cell comprising a block made of a stack of electrodes delimiting between each other compartments of substantial thickness for containing products necessary to the operation of the fuel cell, and an intermediate element located in at least one of said compartments, wherein the volume of said element is such as to leave only a minimum free volume for said product in said compartment, said intermediate element being spaced from the electrodes so that a limited separation space is provided over substantially the whole area of said respective electrodes, and wherein said intermediate element is provided with perforations connecting said limited separation spaces on both sides of said intermediate element.

2. A fuel cell according to claim 1, wherein said intermediate element is made of a material which is chemically non-reactive with respect to the product filling said limited separation space.

3. A fuel cell according to claim 1, wherein said intermediate element is formed of two sheets of small thickness integral with each other and locally delimiting between each other tight confined spaces, said intermediate element being perforated from side to side at places separated from the locations of said tight confined spaces.

4. A fuel cell according to claim 3, wherein said tight confined spaces are filled with a gas.

5. A fuel cell according to claim 4, wherein said gas is air.

6. A fuel cell according to claim 4, wherein said gas is chemically non-reactive with respect to the product contained in the compartment housing said intermediate element.

7. A fuel cell according to claim 4, wherein the product filling said compartment is a fluid and wherein the gas filling said confined spaces of the intermediate element is at a pressure substantially equal to that of said fluid.

8. A fuel cell according to claim 1, wherein said intermediate element shaped as a parallelepiped, has a thickness smaller than the spacing of the electrodes which delimit the compartment of the fuel cell block housing said intermediate element.

9. A fuel cell comprising a block made of a stack of electrodes delimiting between each other compartments of substantial thickness for containing products necessary to the operation of the fuel cell, said products including liquid products and an intermediate element located in at least one of said compartments, wherein said intermediate element comprises, regularly distributed thereon, a plurality of filler means substantially impervious to said liquid products in said compartments, said filler means having a lower density than said liquid product, and said filler means having an overall volume being such as to leave only a minimum free volume for said liquid products in said compartments, said intermediate element being spaced from the electrodes so that a reduced free space is provided over substantially the entire area of each of said respective electrodes, and wherein said intermediate element is provided with a limited number of perforations connecting said reduced free spaces on opposite sides of said intermediate element, said perforations being provided exclusively between said filler means.

10. A fuel cell according to claim 9, wherein said reduced free spaces together occupy 5% of the volume of said compartment.

11. A fuel cell according to claim 9, wherein said filter means further comprises a plurality of sealed bubbles contained therein.

12. A fuel cell according to claim 11, wherein said plurality of sealed bubbles are filled with a gas.

13. A fuel cell according to claim 9, wherein said intermediate element occupies 95% of the volume of said compartment.

* * * * *